(12) United States Patent
Duane et al.

(10) Patent No.: US 8,028,605 B2
(45) Date of Patent: Oct. 4, 2011

(54) CIRCULAR DIVIDING TABLE FOR MACHINE TOOL

(75) Inventors: Jacob Duane, West Sacramento, CA (US); Zachary Piner, West Sacramento, CA (US)

(73) Assignee: Mori Seiki Co., Ltd., Yamato-Koriyama (JP)

( * ) Notice: Subject to any disclaimer, the term of this patent is extended or adjusted under 35 U.S.C. 154(b) by 834 days.

(21) Appl. No.: 12/053,087

(22) Filed: Mar. 21, 2008

(65) Prior Publication Data

US 2009/0235783 A1 Sep. 24, 2009

(51) Int. Cl.
*B23Q 16/10* (2006.01)
(52) U.S. Cl. ............. 74/813 L; 74/813 C; 74/813 R
(58) Field of Classification Search .......... 74/813 R, 74/813 C, 813 L, 822, 824; 192/85.26, 84.7; 188/69, 72.4; 310/77
See application file for complete search history.

(56) References Cited

U.S. PATENT DOCUMENTS

| | | | |
|---|---|---|---|
| 2,975,657 A * | 3/1961 | Samuel | 74/822 |
| 3,941,014 A * | 3/1976 | Benjamin et al. | 74/826 |
| 5,239,892 A * | 8/1993 | Sakai | 74/813 L |
| 5,787,767 A * | 8/1998 | De Bernardi | 74/813 L |
| 5,918,510 A * | 7/1999 | Uemura et al. | 74/813 L |
| 2008/0148901 A1 * | 6/2008 | Nitta | 74/813 R |

FOREIGN PATENT DOCUMENTS

| | | |
|---|---|---|
| JP | 3713190 B2 | 11/2005 |
| JP | 2007-125640 A | 5/2007 |

* cited by examiner

*Primary Examiner* — James Pilkington
*Assistant Examiner* — Thomas Diaz
(74) *Attorney, Agent, or Firm* — Westerman, Hattori, Daniels & Adrian, LLP

(57) ABSTRACT

A circular dividing table includes a brake assembly, in which the piston return spring urges the annular piston with the bottom face of its annular groove. The piston retracts backward and the floating pad return plate contacts the bracket extending inward within the cylindrical bore of the floating pad, thus urging the floating pad backward. Due to the backward displacement of the floating pad, the floating pad is forced to retract from the brake disc. Using a circular dividing table equipped with such a brake assembly, it is possible to release the clamping members forcibly and to make the action of clamping or unclamping precise and conducted with a high responsive speed.

5 Claims, 5 Drawing Sheets

CIRCULAR DIVIDING TABLE FOR MACHINE TOOL

FIELD OF THE INVENTION

The present invention relates to a circular dividing table for a machine tool, also called as a swivel table, a swivel slide, a swivel base, a dividing head, an indexed head, a rotary table, a circular table, etc., used in a machine tool such as a machine center and specifically relates to a circular dividing table for a machine tool equipped with a dividing device which is capable of precise alignment of a rotating shaft at predetermined angular positions.

BACKGROUND ART

In a circular dividing table for a machine tool, the shaft connected with a circular table and driven by a drive motor must be aligned precisely at a desired angular position and then be clamped by a clamping device. In this regard, an apparatus is known in which a DD(direct drive) motor is used as the drive motor and an electromagnetic brake is provided in place of a friction brake as the clamping device(see Japanese Laid-Open Patent Application 2007-125640, for example).

A friction brake of a clamping device is composed of, for example, a brake disc secured integrally with a shaft and clamping members to be pressed against the brake disc. In this, a circular dividing table is known in which a clamping member driven by a piston actuated with air pressure is pressed against the brake disc and the circular dividing table is aligned at the predetermined angular positions (see Japanese Patent No. 3713190, for example). In the circular dividing table disclosed in the above mentioned patent, clamping members on the movable part are driven and pressed against the brake disc to clamp it, after which a return spring acts so as to release the clamping members and return them to the original position.

However, said arrangement is not preferable in which the clamping member is released and returned to the original position by a return spring. This is because of the fact that the action of the arrangement becomes unstable due to the deterioration of the return springs caused by metal fatigue etc. or the retardation of the action may occur due to troubles in mechanism such as poor lubrication. In this regard, some measures are taken such as to use a return spring of a larger spring constant, but such measures suffer from a limitation in the view point of machine design.

SUMMARY OF THE INVENTION

The present invention is made under the above mentioned background.

An object of the present invention is to provide a circular dividing table for a machine tool with a dividing device in which the clamping members are forcibly released to obtain the precise and positive action of clamping and unclamping.

Another object is to provide a circular dividing table for a machine tool with a dividing device in which the clamping members are forcibly released to raise the responsive speed of action of clamping and unclamping.

The following arrangements are adopted to achieve the above objects of the present invention.

In the first aspect of this invention, a circular dividing table for a machine tool is provided with:

a housing (2), a spindle (4) supported rotatably in the housing (2) by a bearing, a stator (21) of a motor (12) secured to the housing (2) therein, a rotor (13) of the motor (12) secured to the spindle (4) so as to confront to the stator (21), a face plate secured to the spindle (4), and a clamping device (39,70,58) for clamping the rotor (13) to the housing (2) in the halting angular position of the face plate (3) driven by the motor (12) and having been divided, by pressing a floating pad (60) against a brake disc (66) secured on the rotor (13), wherein said clamping device (39,70,58) consists of:

drive cylinder means (39) comprising a piston (42) driven by fluid pressure and a cylinder chamber (40) formed in a brake housing (30) for containing the piston (42) therein, a force strengthening mechanism (70) for actuating the floating pad (60) with a force strengthened relative to one caused by the advancement of the piston (42), and floating pad disengaging means (58) which become engaged with at least a portion of the floating pad (60) when clamping action ceases with retirement of the piston (42) and bring the floating pad (60) forcibly to an unclamped position.

In the second aspect of this invention, the circular dividing table for a machine tool in the first aspect is so arranged that said floating pad (60) has a cylindrical bore (61) formed in the central portion of the floating pad (60) and a bracket or brackets (64) extending into the bore (61), while said floating pad disengaging means (58) comprise a floating pad return plate (62) which is secured integrally to the piston (42), positioned in said cylindrical bore (61) of the floating pad (60) and engageable with said bracket or brackets (64) of the floating pad (60) during retirement of the piston (42).

In the third aspect of this invention, the circular dividing table for a machine tool in the first or second aspect is so arranged that said drive cylinder means (39) include a spring or springs(54) for returning the piston (42) to its original, before-pressing position when the floating pad (60) are to be brought to the unclamped position after the clamping action caused by the actuation of the piston (42) so as to press the floating pad (60).

In the fourth aspect of this invention, the circular dividing table for a machine tool in the first or second aspect is so arranged that said force strengthening mechanism (70) is composed of:

a first tapered cam face (72) formed on the front, external, peripheral face of the piston (42) with an inclination angle ($\alpha$), a second tapered cam face (71) formed on the front, inner, peripheral face of the brake housing (30) with an inclination angle ($\beta$) which is larger than said inclination angle ($\alpha$), and plurality of balls (75) disposed along the circumferential groove formed by said first and second cam faces and contacting with the tapered cam faces (71,72) as well as the rear face (76) of the floating pad (60).

In the fifth aspect of this invention, the circular dividing table for a machine tool in the fourth aspect is so arranged that a preliminary tapered cam face (73) with an inclination angle ($\gamma$) larger than said inclination angle ($\alpha$) of the tapered cam face (72) is additively formed in the front portion of said first tapered cam face (72), thus the balls contact with the preliminary tapered cam face (73) in the earlier stage of the advancement of the piston (42) and then contact with said first tapered face (72) in the later stage of the advancement of the piston (42), thereby making the stroke of the piston shorter with an appropriate spring force.

In the sixth aspect of this invention, the circular dividing table for a machine tool in the third aspect is so arranged that said spring (54) is a corrugated compression leaf spring.

Features and advantages of this invention will be explained in further details referring with accompanied drawings.

DETAILED DESCRIPTION OF PREFERRED EMBODIMENTS

Figure 1:
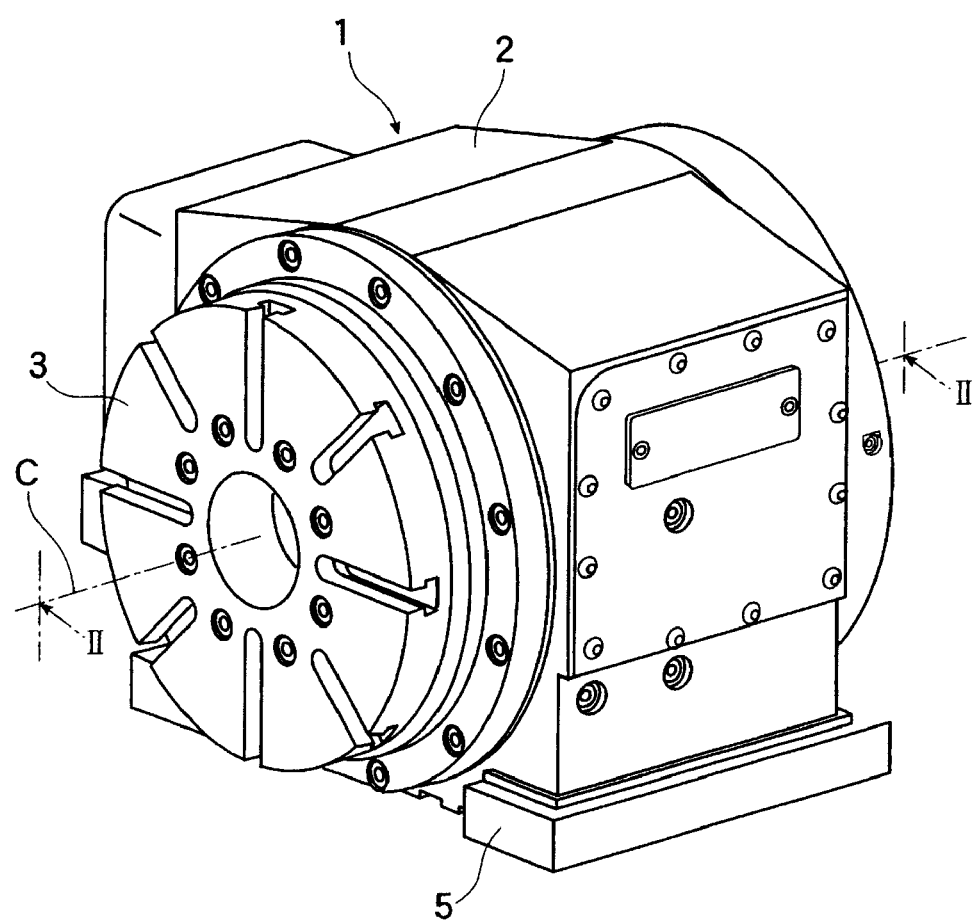
FIG. 1 is an external view of the circular dividing table for a machine tool in a preferred embodiment of the present invention.
Figure 2:
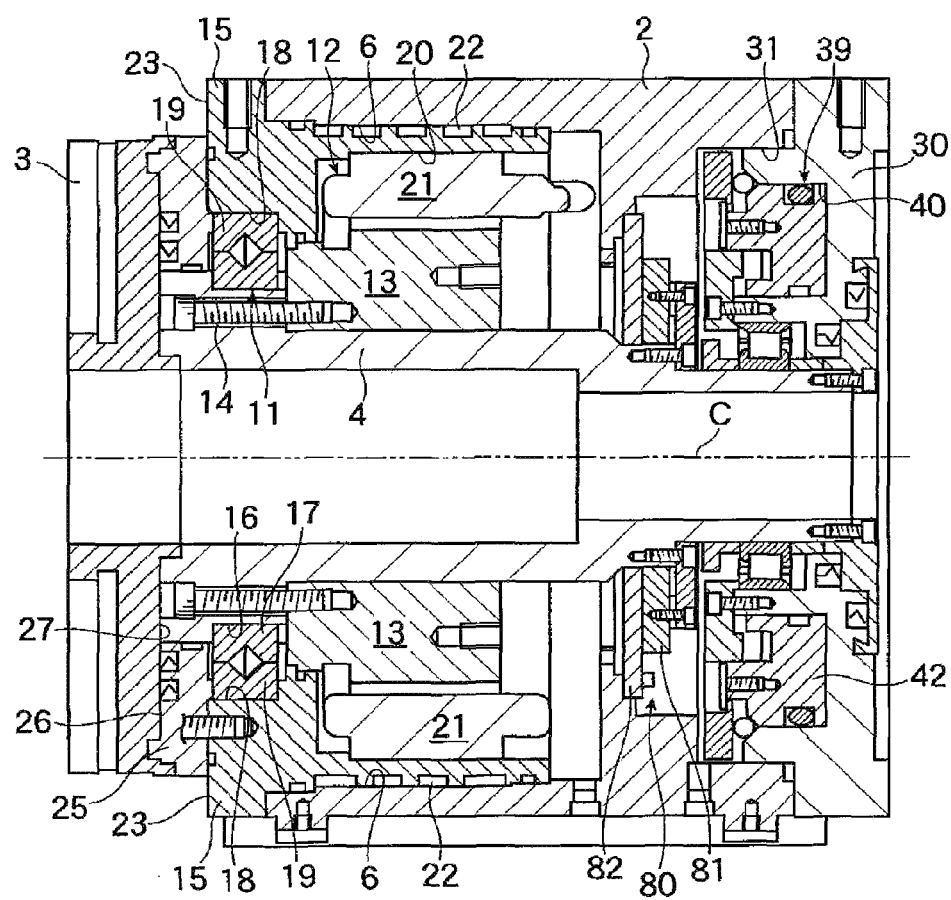
FIG. 2 is a cross-sectional view taken along the line II-II in FIG. 1.

An embodiment of the circular dividing table for a machine tool according to this invention is shown in FIGS. 1 and 2, of which FIG. 1 shows an external view and FIG. 2 shows a cross-sectional view taken along the line II-II in FIG. 1. The circular dividing table 1 for a machine tool consists of a housing 2, a face plate 3 on which a work to be machined by the machine tool is placed and fixed, a spindle 4 as a support shaft which is supported rotatably in the housing 2, etc. The housing 2 has in its lower portion fixture legs 5 which are arranged so as to be secured by bolts, jigs or the like at the predetermined position on the table of the machine tool.

The stator fixing flange 15 supports the spindle 4 rotatably with a main bearing (for example a roller bearing). Around the spindle 4 substantially at its center portion, a rotor 13 as a constituent of a DD motor 12 is fitted onto the spindle 4. The rotor 13 is secured by plurality of bolts 14 which are disposed on the circumference around the axis c of the spindle 4 with a equiangular pitch between one and another. The face plate 3 is secured at the forward end of the spindle 4 by bolts (not shown) inserted into the holes formed at an equiangular pitch on the face plate 3.

The inner race 17 of the main bearing 11 is fitted onto the outer periphery 16 of the forward portion of the spindle 4. The stator fixing flange 15, which is an annular member, is secured to the inner bore 6 of the housing 2 by bolts (not shown). The outer race 19 of the main bearing 11 is fitted into the inner peripheral face 18 of the inner bore at the forward portion of the stator fixing flange 15. Accordingly, the forward portion of the spindle 4 is supported rotatably via the main bearing 11 by the stator fixing flange 15. The stator fixing flange 15 has an inner bore formed at its rear portion and the stator 21 as a constituent of the DD motor 12 with a coil or coils (not shown) is inserted into the inner peripheral face 20 and secured thereto.

The rotor 13 and stator 21 constitute the DD motor 12. A spiral cooling channel 22 is formed on the outer peripheral face of the stator 21. Coolant such as water is caused to flow through the cooling channel 22, hence the stator 22 can be cooled so that its temperature may not exceed a determined level. A front labyrinth plate 25 is secured to the front end face 23 of the stator fixing flange 15 by bolts.

The front labyrinth plate 25 has such a function as to constrain the outer race 19 of the main bearing 11 from one side and to hold it in the fixed state to the stator fixing flange 15. The front face 26 of the front labyrinth plate 25 is disposed so that there is a packing and a minute gap between the front face 26 of the front labyrinth plate 25 and the rear end surface 27 of the face plate 3. This gap is one which composes so called a labyrinth restricting the flow path for fluid, hence it is a constitution which the liquid such as coolant can not penetrate easily during machining. In short, the front labyrinth plate 25 is a member which is provided in order to fix the main bearing 11 as well as to form a labyrinth.

Figure 3:
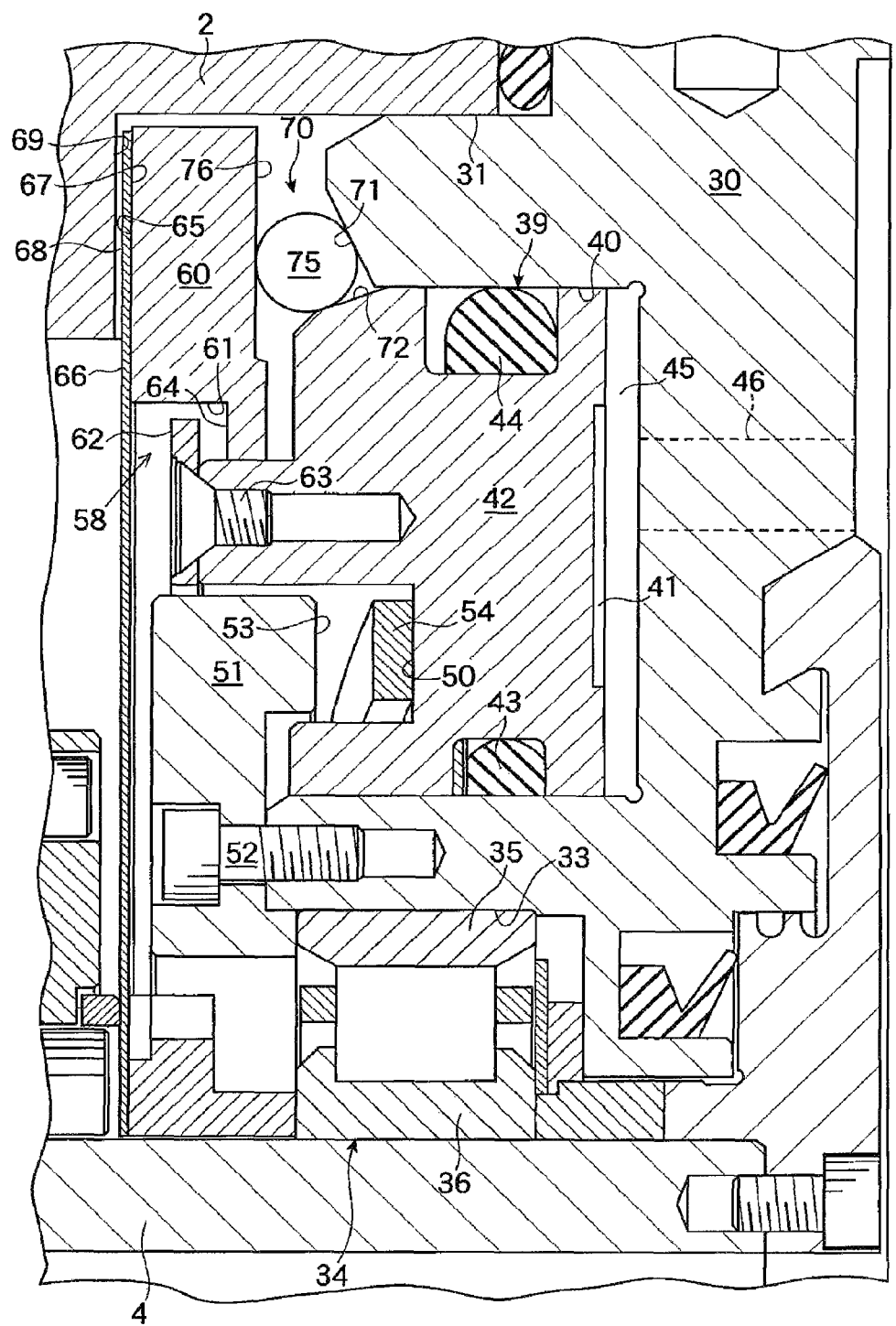
FIG. 3 is enlarged cross-sectional view of the rearward end part of the housing.

FIG. 3 is an expanded cross-sectional view showing the rear end portion of the housing 2. As seen, a disc shaped brake housing 30 is disposed at the rear end of the housing 2. The front portion of the brake housing 30 is fitted into the inner face 31 of the inner bore of the housing 2. The brake housing 30 is secured to the housing 2 by bolts (not shown). The outer race 35 of a roller bearing serving as a rear bearing 34 is fitted into the inner face 33 of the inner bore formed at the center portion of the brake housing 30.

The inner race 36 of the rear bearing 34 is fitted onto the outer face of the rear end portion of the spindle 4. Accordingly, the rear end of the spindle 4 is supported rotatably via the rear bearing 34 in the housing 2. The brake housing 30 has a cylinder chamber 40 formed to profile an annular space, which opens forward around the axis c. An annular piston 42 is inserted into the cylinder chamber 40, in which the piston 42 is movable forward and backward along the axis c of the spindle 4.

O-rings 43 and 44 are disposed in annular grooves provided on the outer and inner peripheral faces of the annular piston 42, respectively, so that the O-rings 43 and 44 may seal the gaps between the inner and outer cylindrical faces of the cylinder chamber 40 and the annular piston 42 to keep an air-tight situation. The brake housing 30 and the annular piston 42 cooperatively form an air chamber 45. Accordingly, the cylinder chamber 40 and the annular piston 42 compose a drive cylinder device 39 actuated with air pressure, in this embodiment. Pressurized air is supplied through an air feed channel 46 into the air chamber 45 to drive the annular piston 42 in the cylinder chamber 40.

An annular groove 50 figured in an annular shape around the axis c of the spindle 4 is formed on the front end face of the annular piston 42. A disc shaped spring retainer 51 is disposed in front of the annular groove 50 so as to cover it at the front side. The spring retainer 51 is secured to the brake housing 30 by plurality of bolts 52 disposed in a circular row. An annular shaped piston return spring 54 is interposed between the rear end face 53 of the spring retainer 51 and the bottom face of the annular groove 50 to be compressed by them.

The piston return spring 54 is a corrugated, compression leaf spring, so that it usually urges the annular piston 42 backward, i.e., towards the side of the air chamber 45. The annular piston 42 is driven forward only when pressurized air is supplied through the air feed channel 46 into the air chamber 45. A disc shaped floating pad 60 is disposed around the spring retainer 51. The floating pad 60, being a kind of brake pad, has an open cylindrical bore 61 formed on the front side of its center portion and has a bracket or brackets 64 which extend inwardly into the bore 61 at the rear side of the floating pad 60.

A floating pad return plate 62 shaped as an annular disc is disposed within the cylindrical groove 61. The floating pad return plate 62 is secured to the annular piston 42 by plurality of counter-sunk bolts 63. The outer periphery of the floating pad return plate 62 becomes engaged with the bracket or brackets 64 of the floating pad 60 during its retirement along with the annular piston 42 and urges the floating pad 60 backward, thus displacing it forcibly by about 0.6 mm.

A brake disc 66 is disposed in front of the floating pad 60 and the central portion of the brake disc 66 is secured to the spindle 4 by bolts (not shown) so that in an usual state the front face 68 of the brake disc 66 is separated from the confronting annular face 69 formed in the housing 2 by a minute distance in order to allow the brake disc 66 rotate freely along with the spindle 4. Accordingly, the floating pad 60 is urged so that the front face 65 of the floating pad 60 presses the brake disc 66 at the face 67 when the floating pad 60 is driven forward by the actuation of the annular piston 42.

By pressing the brake disc 66 in such a manner, the front face 68 of the brake disc 66 comes to contact with the confronting annular face 69, so that the brake disc 66 rotating along with the spindle 4 gets braking action and stops its rotation. As a result, the spindle 4 is locked to the housing 2.

[Force Strengthening Mechanism 70]

Figure 4A:
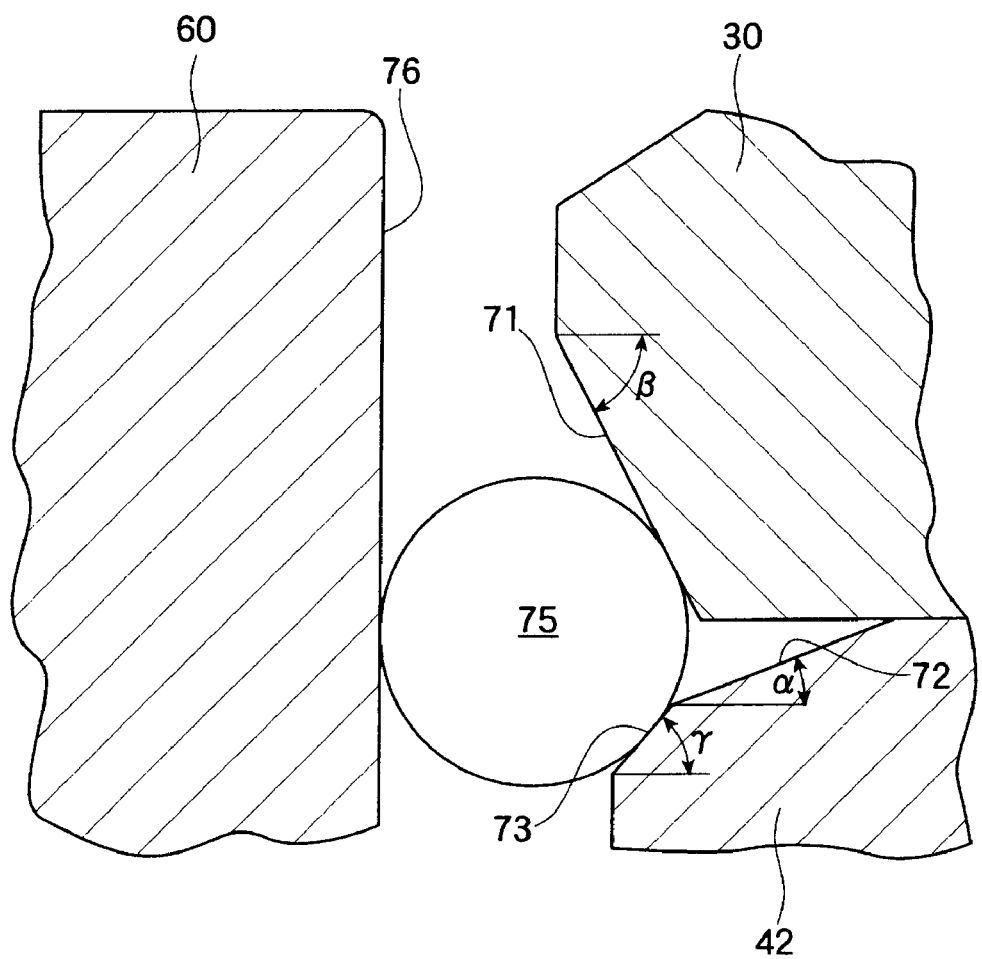
FIG. 4A is a partial enlarged view of the force strengthening mechanism in the earlier stage of advancement of the annular piston.
Figure 4B:
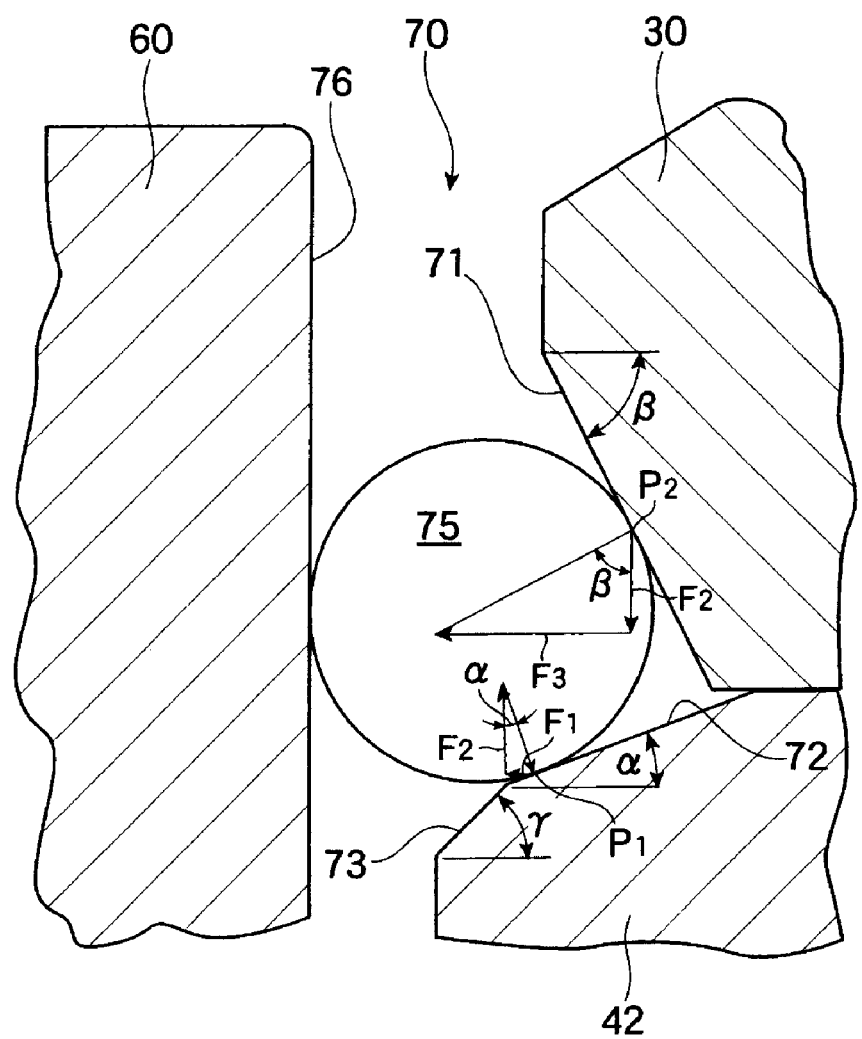
FIG. 4B is a partial enlarged view of the force strengthening mechanism in the later stage of advancement of the annular piston.

FIG. 4A and 4B are expanded views of the force strengthening mechanism 70, of which FIG. 4A shows the situation in the earlier stage of the advancement of the annular piston 42 and FIG. 4B shows the situation in the later stage of the advancement of the annular piston 42.

The floating pad 60 is driven via the force strengthening mechanism 70 by the annular piston 42, where the force strengthening mechanism 70, having a constitution stated below, has such an action as to strengthen the driving force added by the piston 42.

A tapered cam face 71 as a tapered inner conical face with an inclination angle $\beta$ is formed on the inner periphery of the front portion of the brake housing 30, whereas another tapered cam face 72 in which the diameter decreases in the forward direction with an inclination angle $\alpha$ is formed on the outer periphery of the annular piston 42. In the embodiment shown in FIGS. 4A and 4B, a preliminary tapered cam face 73 is additively formed in the front portion of the tapered cam face 72 with a larger inclination angle. The details of the preliminary tapered cam face 73 will be explained later.

Plurality of balls 75 is disposed along the circumferential groove formed by the tapered cam faces 71 and 72. The balls 75 are in contact with the tapered faces 71 and 72 as well as the rear face 76 of the floating pad 60.

Here, an explanation will be made about the process of the load transfer from the annular piston 42 to the floating pad 60. The situation is considered such that the balls are in contact with the tapered cam faces 71 and 72 and the rear face of the floating pad 60 as shown in FIG. 4B in a certain stage of the advancing annual piston 42. Supposing the forward pressing force by the annular piston 42 to be $F_1$, the pressing force $F_1$ is strengthened up to a force $F_2$ in the radial outward direction by the cam action of the tapered cam face 72 at the contacting point $P_1$ of the balls 75 with the tapered cam face 72 and transferred to the balls 75. That is, the force $F_1$ is strengthened up to the force $F_2$ in this force strengthening mechanism.

Consequently, the above mentioned force $F_2$ is strengthened up to a force $F_3$ directed to forward direction by cam action of the tapered cam face 71 at the contacting point P2 of the balls with the tapered cam face 71 and transferred to the floating pad 60. As a result, the floating pad 60 is pushed and advances forward, which in turn causes the brake disc 66 to be pushed forward thereby pressing its front face against the confronting annular face 69 of the housing 2. Thus, the spindle 4 becomes locked to the housing 2.

In the force strengthening due to the cam action, the smaller the inclination angle $\alpha$ of the tapered cam face 72 is, the stronger force is transferred to the balls 75, but the stroke of the piston 42 necessary for displacing the floating pad 60 by a same distance inevitably increases as a result.

In order to improve such situation, the preliminary tapered cam face 73 is advantageously used. The use of the preliminary tapered cam face 73 is based on the fact that a strong force is needed especially at the moment of the contact of the brake disc 66 with the confronting face 69 the housing 2, i.e., in the later stage of the advancement of the piston 42 and, on the other hand, the force to be transferred to the floating pad does not need to be so strong in the earlier stage.

For this, it is so arranged that at the initial moment the annular piston 42 is in the position shown in FIG. 4A, in which the balls 75 contact with the preliminary tapered cam face 73, the inclination angle of which is $\gamma$, at the front portion of the annular piston 42. Between the inclination angle $\gamma$ of the preliminary tapered cam face 73 and the inclination angle $\alpha$ of the inclined face of the tapered cam face 72 on the annular piston 42, there is a relation such that $\alpha<\gamma$.

In this case, the force transferred from the cam face 73 to the balls 75 in the radial outward direction is smaller than one transferred from the cam face 72, but the floating pad 60 is displaced by a longer distance with the same stroke of the annual piston 42.

It is also arranged so that in the later stage of the advancement of the annual piston 42 the balls 75 come to contact with the tapered cam face 72 as shown in FIG. 4B before the brake disc 66 contacts with the confronting face 69 of the housing 2. Thus, in the later stage of the advancement of the annular piston 42, a strong force is transferred from the cam face 72 to the balls 75 as previously explained.

The circular dividing table for a machine tool 1 according to this invention is provided with a rotational position detecting device 80 such as an encoder which detects the angular position of the rotating spindle 4. This rotational position detecting device 80 is composed of a rotational part 81 secured to the spindle 4 and rotating along with the spindle 4 and a disc 82 as a fixed part secured to the housing 2. The disc 82 is secured to the housing 2 by bolts at plurality of points so as to be unable to rotate relative to the housing 2.

While the rotational part 81 rotates upon the rotation of the spindle 4 in this rotational position detecting device 80, the sensor 80 (not shown) provided on the disc 82 detects the rotation of the disc 82 by electrical means and issues pulsed signals corresponding to the rotation of the disc 82 into a control device of the machine tool (not shown), which in turn obtains the angle of rotation of the rotating spindle 4 on the basis of the pulsed signals issued from the rotational position detecting device 80.

Actuation of the Circular Dividing Table in the Embodiment

The actuation of the circular dividing table in the above mentioned embodiment will be explained.

(1) The rotor 13 of the DD motor 12 is driven to rotate, thereby causing the rotational angle of the work placed on the face plate 3 to be changed. When it is desired to clamp the spindle 4 after a rotation by a predetermined angle, the annular piston 42 is advanced towards the clamping position by supplying pressurized air into the air chamber 45 for clamping.

(2) FIG. 3 shows the situation in which clamping is intended to be done, where the floating pad 60 is being pressed against the brake disc 66 to some degree. By the advancement of the annular piston 42 towards the clamping position further from that situation, the front face of the brake disc 66 comes to contact with the annular face 69 formed on the housing 2 and the brake disc 66 is locked along with the spindle 4.

(3) While the annular piston 42 advances forward, the pressing force $F_1$ is strengthened up to $F_2$ in the radial outward direction by the cam action of the tapered cam face 72 (see FIG. 4).

(4) This force $F_2$ is strengthened up to $F_3$ by the tapered cam face 71 and transferred to the floating pad 60.

(5) Along with this, the floating pad 60 advances forward and urges the brake disc 66 forward with the strengthened force $F_3$, so that the spindle 4 becomes locked to the housing 2.

(6) If it is desired to unclamp the rotor 4, the pressurized air is drained from the air chamber 45 by switching the solenoid valve (not shown) so as to cause the annular piston 42 to be freed.

(7) By causing the annular piston 42 to be freed, the piston return spring 54 comes to urge the annular piston 42 with the bottom face of its annular groove 50, so that the annular piston 42 retires backward. During retirement of the annular piston 42, the floating pad return plate 62 secured to the annular piston 42 becomes engaged with the bracket or brackets 64, thereby urging the floating pad 60 backward. In this embodiment, while the annular piston 42 is displaced backward by about 3 mm, the floating pad 60 is displaced backward by about 0.6 mm.

(8) The floating pad 60 is forced to be separated from the brake disc 66 by the backward displacement of the floating pad 60, so that the rotor 4 turns to be in an unclamped state.

With the circular dividing table for a machine tool equipped with the dividing device according to this invention, it is possible to release the clamping members forcibly and to make the action of clamping or unclamping precisely and in a high responsive speed, so that the preciseness of dividing becomes high, allowing a positive actuation of the circular dividing table.

While this invention has been explained for some specified embodiments, this invention is not limited to such embodiments and various modifications will be considered by those skilled in the art without departing from the spirit of this invention.

What is claimed is:

1. A circular dividing table for a machine tool, comprising:
    a housing,
    a spindle supported rotatably in the housing by a bearing,
    a stator of a motor secured to the housing therein,
    a rotor of the motor secured to the spindle so as to confront the stator, and directly driving the spindle to rotate by a predetermined angle,
    a brake disc secured to the spindle, and which may contact a face of the housing so as to be clamped to the housing,
    a face plate secured to the spindle, and
    a clamping device for clamping the rotor to the housing in a halting angular position by pressing a floating pad against the brake disc, thereby causing the brake disc to contact the face of the housing,
    wherein said clamping device comprises
        a drive cylinder means comprising a piston driven by fluid pressure and a cylinder chamber containing the piston therein and being formed in a brake housing,
        a force strengthening mechanism for actuating the floating pad with a force strengthened relative to a force caused by advancement of the piston, and
        a floating pad disengaging means which engages with at least a portion of the floating pad when clamping action ceases due to retracting of the piston, thereby forcibly bringing the floating pad from a clamped position to an unclamped position,
    wherein said floating pad has a cylindrical bore formed in a central portion thereof and at least one bracket extending into the cylindrical bore, and
    wherein said floating pad disengaging means comprises a floating pad return plate which is integrally secured to the piston, said floating pad return plate being positioned in said cylindrical bore of the floating pad and being engageable with said at least one bracket of the floating pad during retraction of the piston.

2. The circular dividing table for a machine tool according to claim 1, wherein said drive cylinder means includes at least one spring for returning the piston to its original, before-pressing position when the floating pad is brought to the unclamped position after the clamping action caused by the actuation of the piston so as to press the floating pad.

3. The circular dividing table for a machine tool according to claim 2, wherein said spring is a corrugated compression leaf spring.

4. The circular dividing table for a machine tool according to claim 1, wherein said force strengthening mechanism comprises
    a first tapered cam face formed on the front, external, peripheral face of the piston with an inclination angle ($\alpha$)
    a second tapered cam face formed on the front, inner, peripheral face of the brake housing with an inclination angle ($\beta$) which is larger than said inclination angle ($\alpha$) and
    plurality of balls disposed along a circumferential groove formed by said first and second cam tapered faces and contacting the first and second tapered cam faces and the rear face of the floating pad.

5. The circular dividing table for a machine tool according to claim 4, wherein a preliminary tapered cam face with an inclination angle ($\gamma$) larger than said inclination angle ($\alpha$) of the first tapered cam face is additively formed in the front portion of said first tapered cam face, such that the balls contact the preliminary tapered cam face in an early stage of the advancement of the piston and then contact said first tapered cam face in a later stage of the advancement of the piston, thereby making the stroke of the piston shorter with an appropriate spring force.

* * * * *